(12) United States Patent
Jorritsma et al.

(10) Patent No.: US 8,718,226 B2
(45) Date of Patent: May 6, 2014

(54) ASSEMBLY METHOD FOR A TILED RADIATION DETECTOR

(75) Inventors: Jorrit Jorritsma, Veldhoven (NL); Tiemen Poorter, Heerlen (NL); Gerardus Franciscus Cornelis Maria Lijten, Veldhoven (NL); Johannes H. M. Van Roosmalen, Sint Oedenrode (NL); Martinus Maria Sens, Veldhoven (NL); Timon Rutger Grob, Eindhoven (NL); Michael Johan Ferdinand Marie Ter Laak, Leende (NL)

(73) Assignee: Trixell, Moirans (FR)

( * ) Notice: Subject to any disclaimer, the term of this patent is extended or adjusted under 35 U.S.C. 154(b) by 231 days.

(21) Appl. No.: 13/130,065

(22) PCT Filed: Nov. 13, 2009

(86) PCT No.: PCT/IB2009/055063
§ 371 (c)(1),
(2), (4) Date: May 19, 2011

(87) PCT Pub. No.: WO2010/058335
PCT Pub. Date: May 27, 2010

(65) Prior Publication Data
US 2011/0222659 A1    Sep. 15, 2011

(30) Foreign Application Priority Data
Nov. 21, 2008   (EP) ..................................... 08169616

(51) Int. Cl.
*A61B 6/00*    (2006.01)

(52) U.S. Cl.
USPC ....................... 378/19; 378/98.8; 250/370.09

(58) Field of Classification Search
USPC ................ 378/19, 98.8; 250/370.08, 370.09, 250/370.11
See application file for complete search history.

(56) References Cited

U.S. PATENT DOCUMENTS

2005/0011613 A1   1/2005  Morimoto
2005/0098732 A1*  5/2005  Liu et al. .................. 250/370.11

* cited by examiner

*Primary Examiner* — Courtney Thomas
(74) *Attorney, Agent, or Firm* — Baker & Hostetler LLP

(57) ABSTRACT

A tiled detector assembly (1000) and a method for making a tiled radiation detector (1000) is described. The innovative feature of this method is that the xyz misalignment of the detector tiles (304, 304'), the origin of various image artifacts, can be significantly reduced by accurate sizing and alignment of the detector tiles (304, 304'). Consequently, image quality, yield and reliability of as-produced tiled radiation detectors are considerably improved.

19 Claims, 7 Drawing Sheets

20 # ASSEMBLY METHOD FOR A TILED RADIATION DETECTOR

FIELD OF THE INVENTION

The present invention relates generally to imaging systems, such as radiographic or X-ray systems, and more particularly, to multi-tile detector assemblies used in such systems and a method of making such assemblies. Even more particularly, the present invention relates to a system and method for assembling detector tiles in manner that minimizes or prevents visible artifacts associated with the tiling.

BACKGROUND OF THE INVENTION

Medical diagnostic and imaging systems are ubiquitous in modern health care facilities. Currently, a number of modalities exist for medical diagnostic and imaging systems. These include computed tomography (CT) systems, x-ray systems (including both conventional and digital/digitized imaging systems), magnetic resonance (MR) systems, positron emission tomography (PET) systems ultrasound systems, nuclear medicine systems and so forth.

Medical imaging systems often generate images by radiating a non-intrusive source into the patient and by reconstructing an image from the portion passing through the patient and impacting an imaging detector. In many imaging systems, the imaging detector may comprise a detector surface comprising a plurality of the detector tiles. For example, x-ray, computed tomography, positron emission tomography, nuclear, and gamma ray imaging detectors often use an ionizing photon detector material, such as Cadmium Zinc Telluride (CZT), Cadmium Telluride (CdTe), and various other crystalline semiconductor materials, which have size limitations due to a variety of production factors. For example, imaging detectors using the CZT material generally require multiple tiles, because CZT crystals can only be grown in relatively small sizes due to yield problems with current technology. Radiation detectors are used in e.g. medical imaging, e.g. X-ray, and non-destructive testing applications. Large-area radiation detectors may require multiple detector tiles joint together, hereafter referred to as tiling. Tiling introduces additional image artifacts caused by e.g. an inactive region or gap between detector tiles, a misalignment in x-, y-, and z direction among detector tiles and by non-linearity differences among detector tiles.

Accordingly, a plurality of CZT tiles are connected to a substrate, such as a silicon wafer or die, in a tiled arrangement to provide the desired size for the imaging detector. Unfortunately, the tiling process tends to create gaps that create visible artifacts in the reconstructed image. The assembly of detector tiles is also complicated by the need to connect the detector tiles electronically to their respective die, which then must be connected to the rest of the image receptor.

In flat detectors based on indirect conversion, a scintillator is coupled to a readout panel composed of one or more detector tiles. The scintillator can be either directly deposited onto the readout panel or first deposited onto a substrate which is then coupled to the readout panel, e.g. with an optical glue or gel. The optical and mechanical properties of this coupling layer have a big impact on image quality (IQ). As said in other words, misalignment in all three directions x, y, z among detector tiles in a tiled detector results in image artifacts. Z-misalignment results in altimetry differences between detector tiles. This may introduce voids or air bubbles in the coupling layer where the detector tiles join (see FIG. 1). Such imperfections affect the local pixel sensitivities, thus leading to image artifacts. Provided these imperfections are stable i.e. do not change and/or move with time, the associated variations in local pixel sensitivities can be corrected by the usual gain correction. If not, the usual gain correction method is not adequate anymore resulting in image artifacts. Image artifacts caused by x-y-misalignment need to be software corrected. To enable adequate correction and/or reduce computing power, the x-y-misalignment should be as small as possible.

Accordingly, a technique is needed for assembling a plurality of detector tiles in a manner that minimizes or prevents image artifacts associated with the inactive region and misalignment between detector tiles. In particular, a technique is needed for reducing gaps between adjacent detector tiles.

SUMMARY OF THE INVENTION

The present technique provides a tiled radiation detector assembly with an (N×M) array of detector tiles, a scintillator layer, a common substrate layer, wherein the array of detector tiles is arranged between the scintillator layer and the substrate layer, wherein each detector tile having a front side facing the scintillator layer and a backside facing the substrate layer and wherein the relative height difference between adjacent front side edges of adjacent detector tiles is less than 2 µm, preferably less than 1 µm.

With the said assembly, misalignment among detector tiles and thus corresponding image artifacts can be reduced significantly. Consequently, image quality, yield and reliability of as-produced tiled detectors are considerably improved.

In an aspect, the present technique provides a method wherein the detector tiles are accurately sized in the horizontal (xy) direction such that the inactive region or gap between edge pixels and tile edge is approximately 15 µm wide without damaging the (edge) pixels, and wherein the amount of residues, e.g. particles caused by the sizing process, adsorbed on (the active side of) the detector tile is minimal. Therefore, the detector tiles are accurately sized in the vertical (z) direction such that thickness differences among the detector tiles are strongly reduced and no additional damage and contamination e.g. particles, organics is introduced.

In particular, height differences between the frontside planes of adjacent detector tiles along the butting line (i.e. position where neighboring tiles join) are critical for image quality and reliability. With the proposed sizing method steps, these variations can be reduced to <1 µm.

In another aspect, the present technique provides a method of making a tiled detector comprising the following step: temporally arranging an (N×M) array of detector tiles front side down on to a flat arranging plate such that inactive regions between adjacent detector tiles having a width in horizontal direction less than four pixel rows.

Preferably, the detector tiles are accurately aligned (xyz) such that (i) the inactive region between detector tiles is zero or one pixel row wide and (ii) the active or front sides of the detector tiles are sufficiently leveled (<1 µm).

In yet another aspect of the invention, after said leveling, a substrate is glued to the backside of the aligned detector tiles. In order to realize said z-alignment accuracy, it is essential that the alignment fixture, common substrate and glue layer exhibit an excellent flatness and are free from particles.

In yet another aspect of the invention, a scintillator panel is then glued to the active side of the detector tiles. Since the active sides of the detector tiles are leveled, the optical coupling between scintillator and detector tiles, and thus image quality, is significantly improved.

With the invention a good optical contact between the detector tiles and scintillator may be established, which is critical for image quality, because the active sides of the detector tiles are leveled according to one aspect of the invention (accurate z-alignment).

Further, the x-y misalignment among detector tiles may be significantly reduced because the detector tiles are accurately sized and aligned. The said accurate alignment of detector tiles may result in less image artifacts. Consequently, image quality, yield, and reliability are strongly improved, thus reducing costs.

In another aspect of the invention, the thermal expansion of scintillator substrate, detector tile and common substrate should be matched to minimize temperature dependent image artifacts. As temperature dependent image artifacts are strongly suppressed, no active cooling is needed, thus reducing costs and improving reliability.

In yet another aspect of the invention, the relative height difference between adjacent front side edges of adjacent detector tiles is less or equal than the relative height difference between adjacent back side edges of the said adjacent detector tiles.

In another aspect of the invention, the scintillator layer and/or the common substrate layer is glued on the array of detector tiles.

In another aspect of the invention, the assembly further comprises an optically clear adhesive layer between the scintillator layer and the detector tiles.

In another aspect of the invention, the assembly further comprises an adhesive layer between the substrate layer and the detector tiles.

In another aspect of the invention, the adhesive layer having a thickness of not exceeding 25 μm.

In another aspect of the invention, the detector tiles are aligned such that an inactive region between adjacent detector tiles has a width of less than four pixel rows, preferably of zero or one pixel row.

In another aspect of the invention, a method of making a tiled detector of high energy radiation or particles such as X-ray, Gamma ray and photons comprises the following step: mounting detector tiles front side down on to a flat vacuum chuck, removing material from the back side of each detector tile by grinding to level the thickness of the detector tiles.

According to the said aspect in one embodiment all detector tiles of the tiled radiation detector are mounted simultaneously face down on the vacuum chuck of a back-grinding tool. The vacuum chuck preferably exhibits an excellent flatness and must be free from particles to ensure that the active sides of detector tiles are leveled. Next, a revolving grinding wheel removes a slice of material from the backside of each detector tile such that also the backsides of the detector tiles are exactly leveled. The end result is that all detector tiles exhibit the same thickness. Preferably, the grinding wheel extends beyond the area formed by the detector tiles, because in that case only a single pass instead of multiple passes are needed, which improves thickness uniformity.

In another aspect of the invention, a method of making a tiled detector of high energy radiation or particles such as X-ray, Gamma ray and photons comprises the following step: temporally arranging an (N×M) array of detector tiles front side down on to a flat arranging plate such that inactive regions between adjacent detector tiles having a width in horizontal direction of less than four pixel rows, preferably of zero or one pixel row.

According to the said aspect an embodiment is provided, wherein the detector tiles are accurately aligned (xyz) with their active side down on an alignment fixture.

The alignment fixture is designed such that vacuum can be applied to each tile individually, once it has been aligned. The alignment fixture must exhibit an excellent flatness and must be free from particles to enable accurate z-alignment of the detector tiles. At the moment the detector tiles are manually aligned using alignment pins along the non-butted edges of the tiles and spacers between the tiles. It is anticipated that this process will be automated e.g. by using a robot arm, as this will greatly improve reproducibility, throughput time, yield and, if needed, alignment accuracy (≤1 μm).

In another aspect of the invention, the temporally arranging an (N×M) array of detector tiles is such that the relative vertical distance between the planes of front sides of adjacent detector tiles is less than 2 μm, preferably less than 1 μm.

In another aspect of the invention, the method further comprises gluing a common substrate layer on to the back side of the detector tiles.

Here, in one embodiment according to the said aspect, a film adhesive (e.g. OCA 8141 supplied by 3M) is vacuum applied or roll laminated on one side of the common substrate (e.g. borosilicate glass) in a first step. This step must be conducted under clean-room conditions to prevent that particles become trapped between the film adhesive and common substrate. The film adhesive as well as the common substrate must exhibit an excellent flatness and thickness uniformity. Then, the common substrate (e.g. borosilicate glass) is attached to the backside of the aligned detector under clean-room conditions to ensure that no particles become trapped between the detector tiles and the common substrate.

In another aspect of the invention, the method further comprises gluing a common scintillator layer on to the front side of the detector tiles. In one embodiment, the scintillator panel may be vacuum coupled to the active sides of the detector tiles under clean-room conditions to avoid entrapment of air and particles between detector tiles and scintillator.

In one embodiment of the said aspect, an optically clear film adhesive ≤25 μm thick (e.g. OCA 8141 supplied by 3M) is vacuum applied or roll laminated on the active side of the scintillator panel (CsI:Tl deposited on an Al or a-carbon substrate) under clean-room conditions to prevent that air and particles become trapped between film adhesive and scintillator.

In another aspect of the invention, the grinding is carried out by a revolving grinding wheel, the wheel extending beyond the area formed by the detector tiles.

In another aspect of the invention, during the temporally arranging step a vacuum is applied to each detector tile.

In another aspect of the invention, at least one of the detector tiles is sized in plane direction with the following steps: aligning a detector panel back side down on a vacuum chuck, wherein the vacuum chuck comprises at least two vacuum channels, wherein one channel is arranged to apply a vacuum to a predefined detector tile region of the detector panel and a second channel is arranged to apply a vacuum to a predefined region of the detector panel adjacent to said detector tile region; applying a vacuum to both channels, cropping parts adjacent to the predefined detector tile region of the detector panel, removing the vacuum from the second channel and removing the cropped parts from the detector tile region.

With the said aspect a dicing process may be developed to enable accurate sizing of the detector tile in the x-y direction. The panel from which the detector tile needs to be singulated is aligned face up on the dedicated vacuum chuck. This vacuum chuck basically consists of two vacuum channels, one for the detector tile and one for the "wing" parts on each side of the detector tile, which are cropped from the detector tile by the dicing process. During dicing, vacuum is applied to both channels. After dicing, only vacuum is applied to detector tile such that the wing parts can be removed from the vacuum chuck This is done in such a way that the wing parts cannot touch and hence do not damage the detector tile. During dicing, the detector tile may be preferably continuously flushed with de-ionized water emerging from a nozzle array to prevent that debris, produced by the dicing process, deposits on the detector tile. Compared to a conventional wafer dicing process, damage of the detector tile and the amount of debris deposited on the active side of the detector tile may be significantly reduced.

According to another embodiment of the invention, a method of making a tiled detector of high energy radiation or particles such as X-ray, Gamma ray and photons comprises the following step: aligning detector tiles one after another and with their active side down on to a scintillator panel to form an array of detector tiles. In one aspect it is preferred to use a robot, precisely a robot arm, for an accurate positioning (e.g. ≤2 µm, preferably ≤1 µm) of the detector tiles. In another aspect it is preferred to use alignment marks which may be defined on the scintillator panel and/or on to the detector tiles.

An optically clear film adhesive is applied on the scintillator panel before the said alignment takes place. In one aspect of the embodiment, vacuum and clean-room conditions are used at least during application of the adhesive to prevent entrapment of air bubbles or particles between adhesive film and scintillator panel.

According to another embodiment of the invention, a method of making a tiled detector comprises the following step: aligning detector tiles one after another with their active (front) side down on to an alignment fixture to form an array of detector tiles; than temporally attaching a mechanical fixture to the back side of the aligned detector tiles forming the array, wherein the mechanical fixture is adapted to move in a vertical direction for each detector tile individually, and, further, removing the the array of detector tiles from the alignment fixture. The mechanical fixture allows for a slight vertical motion (z-direction) of each respective fixture part attached individually on one of the detector tiles during adjustment. The motion in z-direction may compensate altimetry differences among the front or active sides of the detector tiles, e.g. introduced by tile height differences e.g. during scintillator coupling in a next step of the method.

In one aspect of the said method a vacuum is applicable for each detector tile, in one further embodiment preferably individually. In one aspect the vacuum is applicable by means of at least one channel which leads with one of its ends to one of the detector tile. According to one other aspect, the said channel is arranged in the alignment fixture and, thus, leads to the active or frontal side of the respective tile. In another aspect or additionally, the channel is arranged in the mechanical fixture and accordingly leads to the backside of the aligned detector tile.

In the following, there will be described exemplary embodiments of the present invention. It has to be pointed out that of course any combination of features relating to different subject matters is also possible.

It has to be noted that embodiments of the invention have been described with reference to different subject matters. In particular, some embodiments have been described with reference to device type claims, whereas another embodiment has been described with reference to a method type claim. However, a person skilled in the art will gather from the above and the following description that, unless other notified, in addition to any combination of features belonging to one type of subject matter also any combination of features relating to different subject matters, in particular of features of the device type claims and of features of the method type claim, is considered to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment, but to which the invention is not limited. The Figures are shown with vertical exaggeration for better understanding.

On the basis of the above given and the following explanation of a method of making a tiled, a skilled person will be able to translate the steps of the method into a computer program for carrying out the method.

DETAILED DESCRIPTION OF EMBODIMENTS

Figure 1:
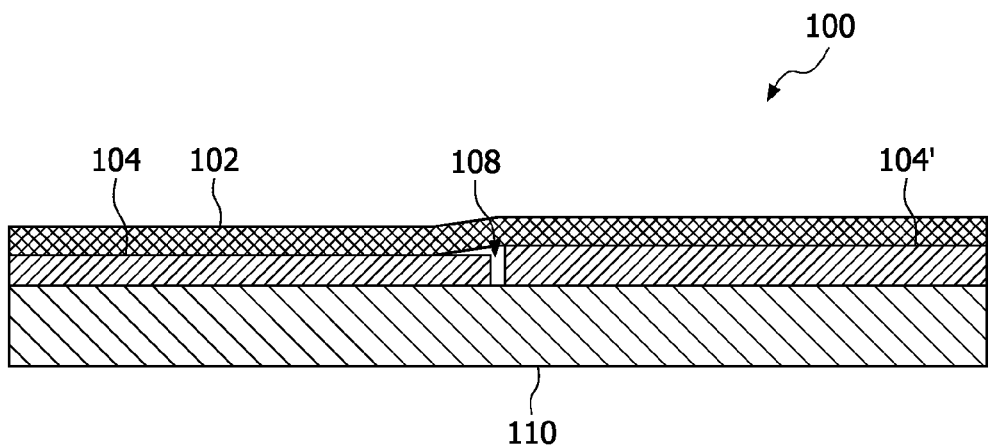
FIG. 1 shows a side view of a tiled detector as known from prior art.

According to FIG. 1, a flat tiled detector assembly 100 based on indirect conversion is shown, wherein a scintillator 102 is coupled to a readout panel composed of one or more detector tiles 104, 104' arranged on to a substrate layer 110. The scintillator 102 can be either directly deposited onto the readout panel or first deposited onto a substrate (not shown here) which is then coupled to the readout panel, e.g. with an optical glue or gel. The optical and mechanical properties of this coupling layer have a big impact on image quality (IQ).

Hence, misalignment in all three directions x, y, z among detector tiles 104 in a tiled detector assembly 100 results in image artifacts. Z-misalignment results in altimetry differences between detector tiles. This may introduce voids 108 or air bubbles in the coupling layer where the detector tiles 104, 104' join. Such imperfections affect the local pixel sensitivities of each detector tile, thus leading to image artifacts.

Figure 2:
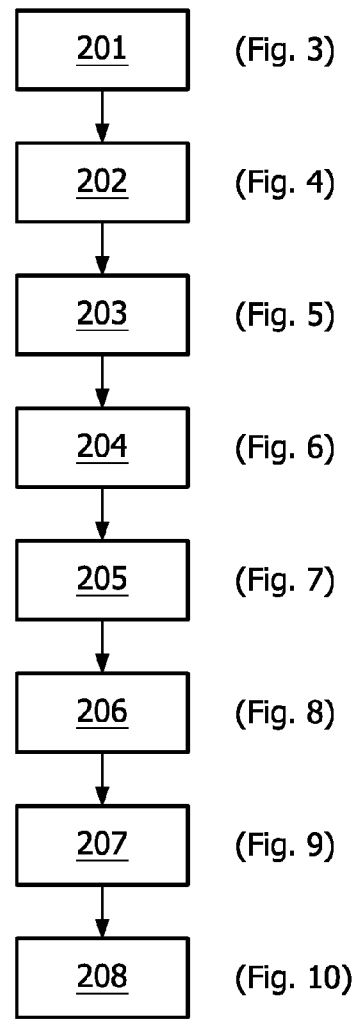
FIG. 2 shows a flow chart of a method according to the invention.

According to FIG. 2 one proposed assembly method enables manufacturing of tiled flat detectors comprising detector tiles in a (N×M) arrangement, where N and M are integer numbers. Below, the proposed assembly process is described in more detail including schematic views according to FIGS. 3 to 10 for a tiled detector with N=2 and M=1.

Figure 3:
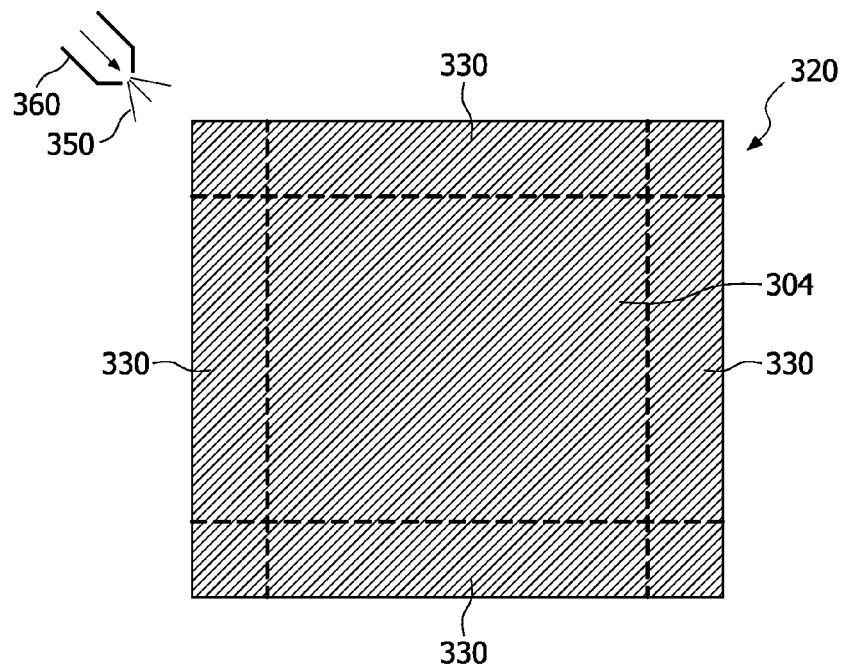
FIG. 3 shows a schematic top view of a detector panel.

A preferably customized dicing process is developed in first step 201 to enable accurate sizing of a detector tile 304 in the x-y direction (FIG. 3). The panel 320 from which the detector tile 304 needs to be singulated is aligned face up on a dedicated vacuum chuck (not shown here). This vacuum chuck basically consists of two vacuum channels, one for the detector tile and one for the "wing" parts 330 on each side of the detector tile, which are cropped from the detector tile by the dicing process. During dicing, vacuum is applied to both channels. After dicing, only vacuum is applied to detector tile 304 such that the wing parts 330 can be removed from the vacuum chuck. This is done preferably in such a way that the "wing parts" 330 cannot touch and hence do not damage the detector tile 304. During dicing, the detector tile 304 is preferably continuously flushed with de-ionized water 350 emerging from a nozzle array 360 to prevent that debris, produced by the dicing process, deposits on the detector tile 304. Compared to a conventional wafer dicing process, damage of the detector tile 304 and the amount of debris deposited on the active side of the detector tile 304 is significantly reduced.

Figure 4:
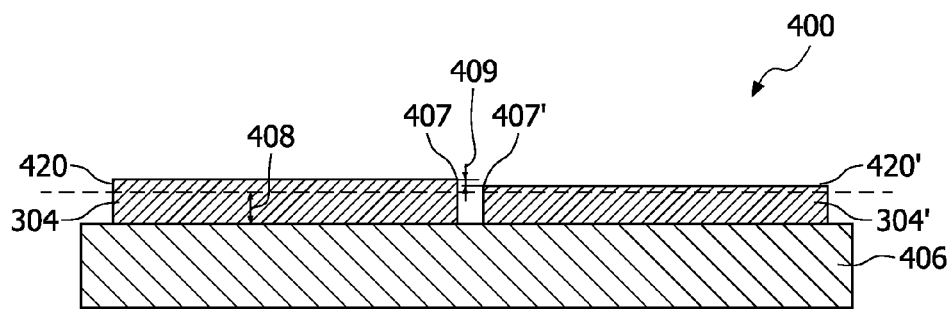
FIG. 4 is a side view of two detector tiles mounted on a vacuum chuck.

The second step 202 relates to accurate sizing of detector tiles in z-direction (FIG. 4). All detector tiles 304, 304' constituting a tiled radiation detector 400 are mounted simultaneously with their active sides or front sides down on the vacuum chuck 406 of a back-grinding tool, not shown here. The vacuum chuck 406 exhibits preferably an excellent flatness and is free from particles to ensure that the active sides of detector tiles 304, 304' are leveled up to a predefined accuracy. Next, a revolving grinding wheel (not shown) removes a slice of material 420, 420' from the backside of each detector tile 304, 304' such that also the backsides of the detector tiles are exactly leveled. The result after grinding is that all detector tiles exhibit the same thickness 408. The backside of the detector tiles comprises grinding marks (not shown) due to the said grinding process. Preferably the grinding wheel extends beyond the area formed by the detector tiles 304, 304', because in that case only a single pass instead of multiple passes are needed, which improves thickness uniformity.

Figure 5:
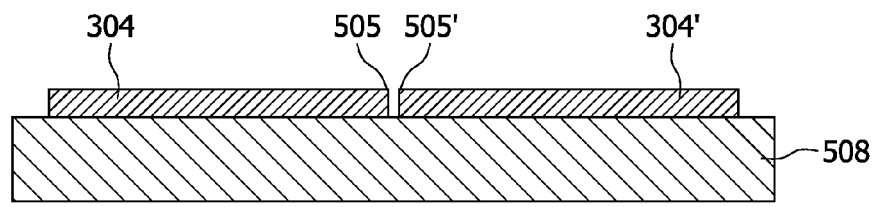
FIG. 5 shows a side view the detector tiles of FIG. 4 on an alignment fixture.
Figure 6:
FIG. 6 is a side view of a substrate layer.
Figure 7:
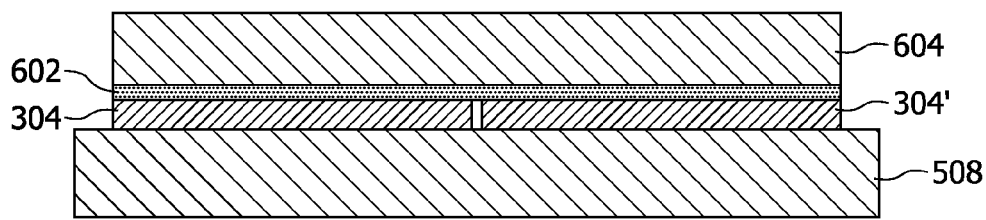
FIG. 7 is a side view of the substrate layer of FIG. 6 attached to the backside of two detector tiles according to FIGS. 4 and 5.

Importantly, the relative height difference between adjacent front side edges 505, 505' shown e.g. in FIG. 5 of adjacent detector tiles 304, 304' is less (without the grinding step but with aligned front sides) or equal (e.g. by grinding) than the relative height difference 409 between adjacent back side edges 407, 407' of the said adjacent detector tiles.

In the third step 203, the detector tiles 304, 304' are aligned on to an alignment fixture 508 (FIG. 5). The detector tiles 304, 304' are accurately aligned (xyz) with their active side down on an alignment fixture 508. In one embodiment the alignment fixture 508 is designed such that vacuum can be applied to each tile 304, 304' individually, once it has been aligned. The alignment fixture 508 preferably exhibits an excellent flatness and must be free from particles to enable accurate z-alignment of the detector tiles 304, 304'. At the moment the detector tiles 304, 304' are manually aligned using alignment pins along the non-butted edges of the tiles 304, 304' and spacers between the tiles 304, 304'. It is anticipated that this process will be automated in one embodiment e.g. by using a robot arm, as this will greatly improve reproducibility, throughput time, yield and, if needed, alignment accuracy (≤1 μm).

In the fourth step 204, a film adhesive 602 is applied on a common substrate 604.

The film adhesive 602 (e.g. OCA 8141 supplied by 3M) is vacuum applied or roll laminated on one side of the common substrate 604 (e.g. borosilicate glass). This step must be conducted under clean-room conditions to prevent that particles become trapped between the film adhesive 602 and common substrate 604. The film adhesive 602 as well as the common substrate must exhibit an excellent flatness and thickness uniformity.

In the fifth step 205 (FIG. 7), the common substrate 604 is attached on to backside of the aligned detector tiles 304, 304'. The common substrate 604 is preferably attached to the backside of the aligned detector tiles 304, 304' under clean-room conditions to ensure that no particles become trapped between the detector tiles 304, 304' and the common substrate 604.

Figure 8:
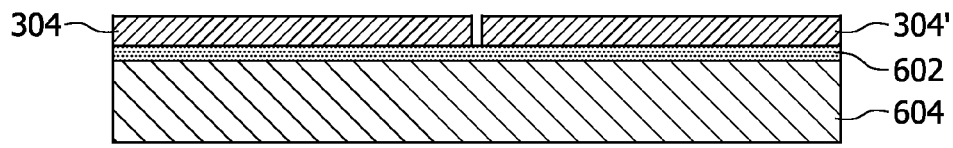
FIG. 8 is a side view of an assembly flipped face up according to FIG. 7.
Figure 9:
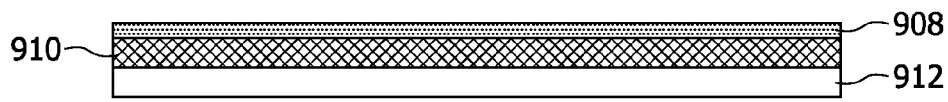
FIG. 9 is a side view of a scintillator layer between a substrate layer and a film adhesive.
Figure 10:
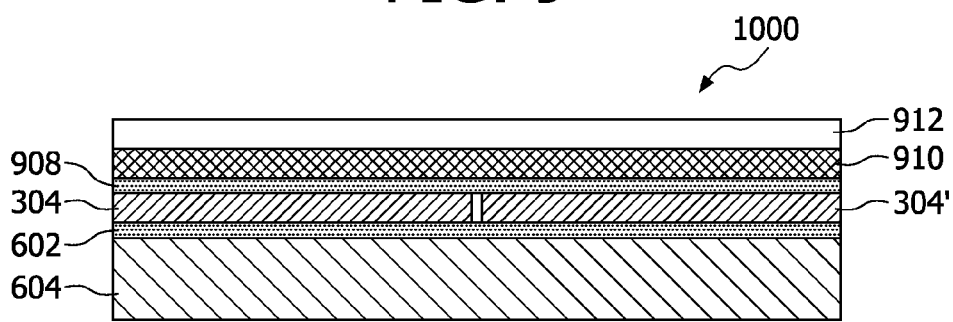
FIG. 10 is a side view of a detector assembly according to the invention.

In the sixth step 206 (FIG. 8), the assembly is removed from the alignment fixture and flipped such that the active sides of the detector tiles 304, 304' are facing up (FIG. 8).

In the seventh step 207 (FIG. 9), an optically clear film adhesive 908 ≤25 μm thick (e.g. OCA 8141 supplied by 3M) is vacuum applied or roll laminated on the active side of a scintillator layer 910 (CsI:Tl deposited on an Al or a-carbon substrate 912) under clean-room conditions to prevent that air and particles become trapped between film adhesive 908 and scintillator 910.

In the eighth step 208 (FIG. 10), the scintillator layer 910 is vacuum coupled to the active sides of the detector tiles 304, 304' under clean-room conditions to avoid entrapment of air and particles between detector tiles 304, 304' and scintillator layer 910 of the detector assembly 1000.

It may be important that even with further assembly methods proposed in other independent claims, the tiled detectors are also accurately sized and aligned such that image artifacts are significantly reduced. First, the detector tiles may be accurately sized in the horizontal (xy) direction such that the inactive region between edge pixels and tile edge is e.g. approximately 15 μm wide without damaging the (edge) pixels, and the amount of residues, e.g. particles caused by the sizing process, adsorbed on (the active side of) the detector tile is minimal.

Next, the detector tiles may be either collectively (FIG. 16) or individually (FIG. 11) attached to the scintillator panel such that their active or front sides are automatically leveled. Consequently, the optical coupling between scintillator and detector tiles, and thus image quality, is significantly improved. According to a first embodiment FIG. 16 the detector tiles are first accurately aligned and then collectively vacuum bonded to the scintillator panel. According to FIG. 11, the detector tiles are individually aligned and subsequently vacuum bonded to the scintillator panel. Thanks to the accurate sizing process, the inactive region between adjacent detector tiles is preferably not more than one pixel row (50 μm) wide. Dedicated alignment equipment enables an xy-alignment accuracy of ≤2 μm or preferably ≤1 μm. The sizing process, the way an (optional) common substrate is attached to the backside of the detector tiles and the interconnect assembly may be the same for both assembly options described in more detail below.

To enable accurate alignment, it may be essential that alignment and scintillator coupling is conducted under cleanroom conditions to minimize particle contamination.

Preferably, the thermal expansion of scintillator substrate, detector tiles and common substrate are matched to minimize temperature dependent image artifacts.

Figure 11:
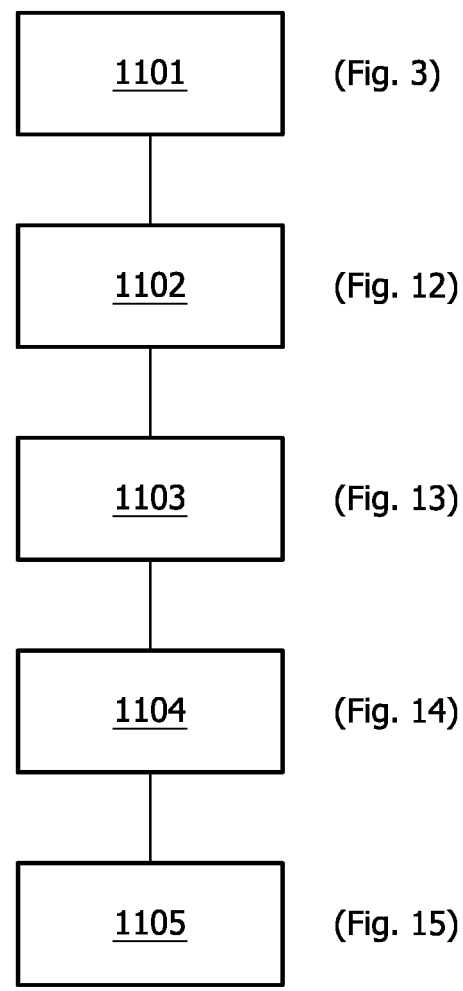
FIG. 11 shows a flowchart of another method according to the invention.

According to FIG. 11 one method enables manufacturing of tiled flat detectors comprising detector tiles in a (N×M) arrangement, where N and M are integer numbers. Below, the proposed assembly process is described in more detail including schematic views according to FIGS. 3, and 12 to 15 for a tiled detector with N=2 and M=1.

A preferably customized dicing process is developed in first step 1101 to enable accurate sizing of a detector tile 304 in the x-y direction (FIG. 3). Step 1101 is equal to step 201 described above. The dicing process is preferred but not necessarily used within the described methods.

Figure 12:
FIG. 12 is a sectional side view of a scintillator layer and an adhesive layer.
Figure 13:
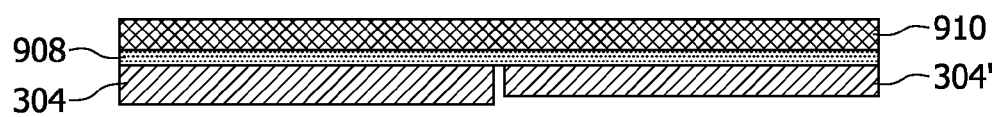
FIG. 13 shows a sectional side view of detector tiles on the scintillator layer of FIG. 12.
Figure 14:
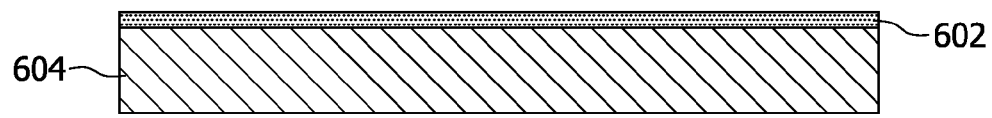
FIG. 14 is a side view of a substrate layer.
Figure 15:
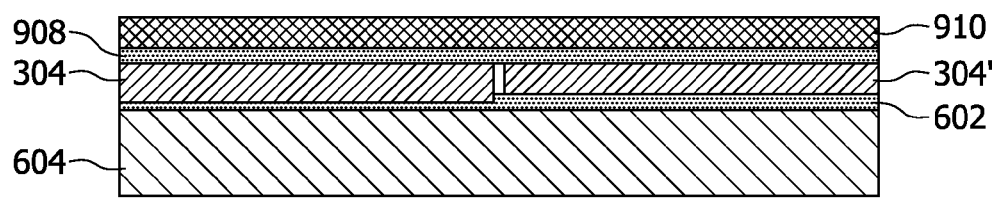
FIG. 15 is a sectional side view of a further detector assembly according to the invention.

In a second step 1102 (FIG. 12) an optically clear film adhesive 908 (e.g. 25 μm thick e.g. OCA 8141 supplied by 3M) is applied on the scintillator panel 910 (CsI:Tl deposited on an aluminium, a-carbon, or fiberoptic (FOP) substrate) under vacuum and clean-room conditions to prevent entrapment of air and particles between adhesive film 908 and scintillator panel 910 (FIG. 12). In case of a FOP substrate, the optical adhesive is applied on the FOP side, else on the scintillator side. Alternatively, the adhesive is roll laminated on the active side of the scintillator layer.

In a third step 1103 (FIG. 13), detector tiles 304, 304' are aligned and coupled one by one to a scintillator panel 910 under clean-room and vacuum conditions to avoid air and particles from being trapped between detector tiles 304, 304' and scintillator panel 910/adhesive layer 908. In case of a scintillator panel with a FOP substrate, the active side of the detector tiles 304, 304' is bonded by the adhesive layer 908 to the FOP side, else to the scintillator side. Accurate positioning (e.g. ≤2 μm or better ≤1 μm) of the detector tiles can be accomplished using a robot arm and alignment marks (not shown here) defined on the scintillator panel and/or the detector tiles. In other words aligning detector tiles (304, 304') one after another and with their active side down on to a scintillator panel to form an array of detector tiles is proposed within one of the claimed methods.

In a fourth step 1104 (FIG. 14) an adhesive 602 is applied on one side of the common substrate 604 (e.g. borosilicate glass). It is essential that the adhesive 602 is able to compensate for small altimetry differences on the backside between detector tiles, introduced by e.g. tile height differences (see FIG. 13). An example of such an adhesive is foam adhesive.

In a fifth step 1105 (FIG. 15), the common substrate 604 (e.g. borosilicate glass) is attached to the backside of the aligned detector tiles 304, 304' under clean-room conditions to ensure that no particles become trapped between detector tiles and common substrate.

Figure 16:
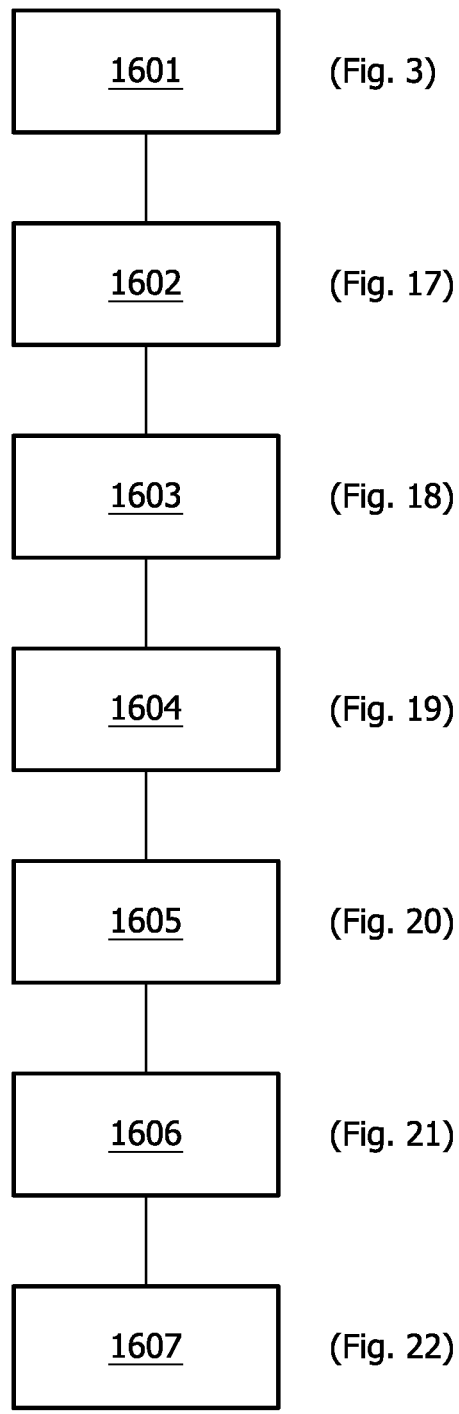
FIG. 16 shows a flowchart of another method according to the invention.
Figure 17:
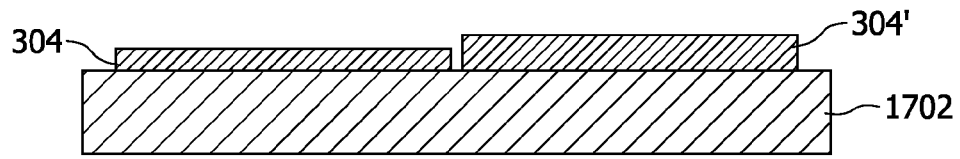
FIG. 17 is a sectional side view of an alignment fixture with two detector tiles.

According to FIG. 16 a further method enables said manufacturing of tiled flat detectors comprising detector tiles in a (N×M) arrangement, where N and M are integer numbers. Below, the proposed assembly process is described in more detail including schematic views according to FIGS. 3, and 17 to 22 for a tiled detector with N=2 and M=1.

A preferably customized dicing process is developed in first step 1601 to enable accurate sizing of a detector tile 304 in the x-y direction (FIG. 3). Step 1601 is equal to step 201 or step 1101 described above. The dicing process is preferred but not necessarily used within the described method.

In a second step 1602 (FIG. 17), the detector tiles 304, 304' are accurately aligned (xyz) with their active side down on an alignment fixture 1702.

The alignment fixture 1702 is designed such that vacuum can be applied to each tile individually, once it has been aligned. The alignment fixture must exhibit an excellent flatness and must be free from particles to enable accurate alignment of the detector tiles 304, 304'. At the moment the detector tiles are manually aligned using alignment pins (not shown here) along the non-butted edges of the tiles and spacers between the tiles. It is anticipated that this process will be automated e.g. by using a robot arm, as this will greatly improve reproducibility, throughput time, yield and, if needed, alignment accuracy (≤2 μm or ≤1 μm).

Figure 18:
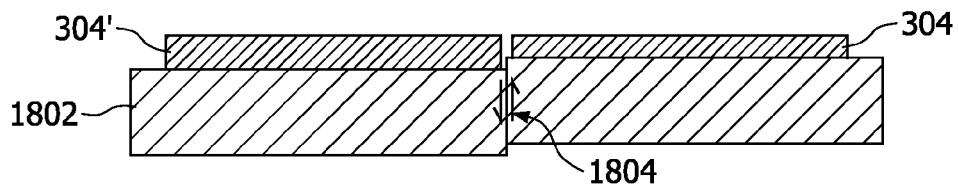
FIG. 18 shows a sectional side view of the detector tiles on a mechanical fixture.
Figure 19:
FIG. 19 is a sectional side view of a scintillator layer.
Figure 20:
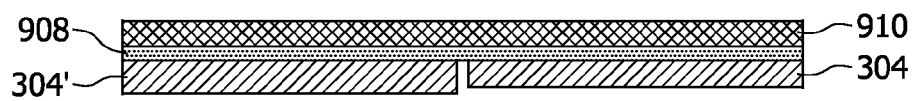
FIG. 20 is a sectional side view of a scintillator layer with two detector tiles.
Figure 21:
FIG. 21 is a sectional side view of a substrate layer.
Figure 22:
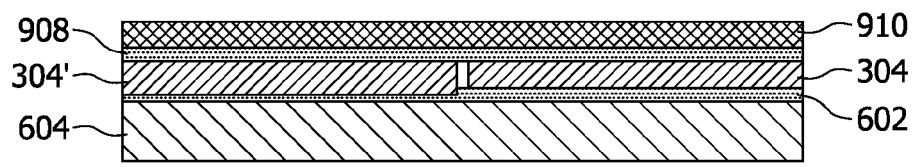
FIG. 22 is a sectional side view of a further detector assembly according to the invention.

In a third step 1603 (FIG. 18) a mechanical fixture 1802 is attached temporally to the backside of aligned detector tiles 304, 304', e.g. by applying a vacuum to each tile using at least one channel. The mechanical fixture 1802 allows for a slight vertical motion (z-direction 1804) of each detector tile 304, 304' individually while maintaining its xy-alignment. This way altimetry differences among the active sides of the detector tiles, e.g. introduced by tile height differences as shown in FIG. 18, are automatically compensated during scintillator coupling (step 1605, FIG. 20). After attachment of the mechanical fixture 1802, the tile assembly 304, 304' is removed from the alignment fixture 1802 and may be flipped such that the active sides of the detector tiles 304, 304' are oriented face up.

Then, in a fourth step 1604 (FIG. 19) an optically clear film adhesive 908 (e.g. 25 μm thick e.g. OCA 8141 supplied by 3M) is applied on the scintillator panel 910 (CsI:Tl deposited on an aluminum, a-carbon, or fiberoptic (FOP) substrate) preferably under vacuum and clean-room conditions to prevent entrapment of air and particles between adhesive film and scintillator panel. In case of a FOP substrate, the optical adhesive 908 is applied on the FOP side, else on the scintillator side.

In a fifth step 1605 (FIG. 20), the detector tiles 304, 304' are coupled to a scintillator panel 910 using the adhesive layer 908. The detector tiles 304, 304' are collectively coupled to the scintillator panel 910 preferably under clean-room and vacuum conditions to avoid air and particles from being trapped between detector tiles 304, 304' and adhesive layer/scintillator panel. In case of a scintillator panel with a FOP substrate, the active side of the detector tiles is bonded to the FOP side, else to the scintillator side. When the detector tiles are brought into contact with the scintillator panel, their active sides are automatically leveled by the mechanical fixture attached to their backside. After scintillator panel bonding, the mechanical fixture is removed.

In a sixth step 1606 (FIG. 21) an adhesive 602 is applied on one side of a common substrate layer 604 (e.g. borosilicate glass). It is essential that the adhesive is able to compensate for small altimetry differences on the backside between detector tiles, introduced by e.g. tile height differences shown e.g. in FIG. 17. An example of such an adhesive is foam adhesive.

In a seventh step 1607 (FIG. 22) the common substrate 604 is attached to the backside of the aligned detector tiles 304, 304' under clean-room conditions to ensure that no particles become trapped between detector tiles and adhesive 602 or common substrate.

The proposed assembly method can be applied for the manufacturing of tiled (X-ray) detectors for medical imaging and non-destructive testing. Although it is compatible with various detector tile types e.g. a-Si, mono-Si, it is particularly useful for manufacturing large-area mono-Si flat detectors because mono-Si technology is the successor of amorphous Si (a-Si) technology, currently the default detector tile technology in flat detectors, because it may offer better performance and more functionality. Large-area mono-Si detectors require tiling because the size of mono-Si detector tiles is limited by the maximum Si wafer size, which is currently 12 inch.

The invention claimed is:

1. A tiled radiation detector assembly (1000), the assembly comprising:
   an (N×M) array of detector tiles (304, 304');
   a scintillator layer (910); and
   a common substrate layer (604),
      wherein the array of detector tiles (304, 304') is arranged between the scintillator layer and the substrate layer,
      wherein each detector tile (304, 304') having a front side facing the scintillator layer and a backside facing the substrate layer, and
      wherein the relative height difference between adjacent front side edges (505, 505') of adjacent detector tiles (304, 304') is less than 2 μm.

2. The assembly (1000) of claim 1, wherein each backside of the detector tiles comprises grinding marks.

3. The assembly (1000) of claim 1, wherein the detector tiles comprise at least one alignment means, including at least an alignment pin and/or a spacing element attached along a tile edge.

4. The assembly (1000) of claim 1, wherein the relative height difference between adjacent front side edges (505, 505') of adjacent detector tiles (304, 304') is less or equal than the relative height difference (409) between adjacent back side edges (407, 407') of the said adjacent detector tiles.

5. The assembly (1000) of claim 1, wherein the scintillator layer (910) and/or the common substrate layer (604) is glued on the array of detector tiles (304, 304').

6. The assembly (1000) of claim 1, further comprising an optically clear adhesive layer (908) between the scintillation layer (910) and the detector tiles (304, 304') and/or comprising an adhesive layer (602) between the substrate layer (604) and the detector tiles (304, 304').

7. The assembly (1000) of claim 1, wherein the detector tiles are aligned such that an inactive region between adjacent detector tiles (304, 304') has a width of less than four pixel rows.

8. The assembly (1000) of claim 1, wherein the relative height difference between adjacent front side edges (505, 505') of adjacent detector tiles (304, 304') is less than 1 μm.

9. The assembly (1000) of claim 7, wherein the width is of zero or one pixel row.

10. An X-ray system, comprising:
    an X-ray source and an X-ray detector, rotatably mounted on a support device, wherein the X-ray detector (1000) comprises:
       an (N×M) array of detector tiles (304, 304');
       a scintillator layer (910); and
       a common substrate layer (604),
          wherein the array of detector tiles is arranged between the scintillator layer and the substrate layer,
          wherein each detector tile (304, 304') having a front side facing the scintillator layer and a backside facing the substrate layer, and
          wherein the relative height difference between adjacent front side edges of adjacent detector tiles (304, 304') is less than 2 μm.

11. The X-ray system of claim 10, wherein the relative height difference between adjacent front side edges (505, 505') of adjacent detector tiles (304, 304') is less than 1 μm.

12. A method of making a tiled detector of high energy radiation or particles including X ray, Gamma ray and photons, the method comprising:
    aligning detector tiles (304, 304') one after another and with their respective active sides down on to a scintillator panel to form an array of detector tiles; and
    attaching a substrate layer on to the back side of the detector tiles forming the array, after said aligning, wherein the substrate layer comprises an adhesive layer.

13. The method of claim 12, wherein the adhesive layer is adapted to compensate altimetry differences between respective backsides of adjacent detector tiles.

14. The method of claim 12, wherein at least one of the detector tiles (304, 304') is sized in plane direction with the following steps:
    aligning a detector panel back side down on a vacuum chuck, wherein the vacuum chuck comprises at least two vacuum channels, wherein one channel is arranged to apply a vacuum to a predefined detector tile region (304, 304') of the detector panel and a second channel is arranged to apply a vacuum to a predefined region of the detector panel adjacent to said detector tile region;
    applying a vacuum to both channels; cropping parts adjacent to the predefined detector tile region of the detector panel;
    removing the vacuum from the second channel; and
    removing the cropped parts from the detector tile region (304, 304').

15. A method of making a tiled detector of high energy radiation or particles including X ray, Gamma ray and photons, the method comprising: aligning detector tiles (304, 304') one after another and with their active side down on to an alignment fixture to form an array of detector tiles;
    temporally attaching a mechanical fixture to the backside of the aligned detector tiles forming the array, wherein the mechanical fixture is adapted to move in a vertical direction for each detector tile individually; and
    removing the array of detector tiles from the alignment fixture.

16. A method of making a tiled detector of high energy radiation or particles including X ray, Gamma ray and photons, the method comprising:
    mounting detector tiles (304, 304') front side down on to a flat vacuum chuck (406); removing material (420, 420') from the back side of each detector tile (304, 304') by grinding to level the thickness (408) of the detector tiles.

17. A method of making a tiled detector (1000) of high energy radiation or particles including X ray, Gamma ray and photons, the method comprising:
    temporally arranging an (N×M) array of detector tiles (304, 304') front side down on to a flat arranging plate (508) such that inactive regions between adjacent detector tiles having a width in a horizontal direction of less than four pixel rows.

18. The method of claim 17, wherein the width in the horizontal direction is less than one pixel row.

19. The method of claim 18, wherein the width in the horizontal direction is zero pixel rows.

* * * * *